US008457770B1

(12) United States Patent
Martin et al.

(10) Patent No.: US 8,457,770 B1
(45) Date of Patent: Jun. 4, 2013

(54) RATINGS-BASED DIGITAL MEDIA DISTRIBUTION AND REPRODUCTION FOR A WIRELESS NETWORK

(75) Inventors: Geoffrey S. Martin, Overland Park, KS (US); Jonathan R. Kindred, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1381 days.

(21) Appl. No.: 12/099,220

(22) Filed: Apr. 8, 2008

(51) Int. Cl.
*G06F 17/00* (2006.01)
(52) U.S. Cl.
USPC ............................................... 700/94; 725/28
(58) Field of Classification Search
USPC ............................................... 700/94; 725/28
See application file for complete search history.

(56) References Cited

U.S. PATENT DOCUMENTS

| | | | |
|---|---|---|---|
| 5,778,135 A * | 7/1998 | Ottesen et al. | 386/282 |
| 7,181,297 B1 | 2/2007 | Pluvinage et al. | |
| 7,437,772 B1 * | 10/2008 | Thenthiruperai et al. | 726/30 |
| 7,533,061 B1 * | 5/2009 | Cheng et al. | 705/50 |
| 2004/0213414 A1 | 10/2004 | Harris | |
| 2006/0026302 A1 | 2/2006 | Bennett et al. | |

\* cited by examiner

*Primary Examiner* — Joseph Saunders, Jr.

(57) ABSTRACT

A digital media distribution system has a wireless network serving a plurality of wireless subscribers wherein the wireless network supports digital media file transfer. A content server is coupled to the wireless network for distributing media items to wireless subscribers upon request. The media items each comprises a plurality of rated versions, wherein the rated versions of each particular media item depict the same media content customized to meet a respective rating from a plurality of ratings. The content server offers each media item for downloading as a single unit containing the plurality of rated versions. A subscriber terminal selects and downloads selected media items as respective single units to be stored in the subscriber terminal. The subscriber terminal includes a trigger stored in the subscriber terminal. The trigger has a value for identifying one of the plurality of ratings to be used by the subscriber terminal for accessing the downloaded media items. A media application on the subscriber terminal activates a downloaded media item according to the rated version specified by the trigger value for the subscriber terminal and ignoring the other rated versions.

17 Claims, 4 Drawing Sheets

RATINGS-BASED DIGITAL MEDIA DISTRIBUTION AND REPRODUCTION FOR A WIRELESS NETWORK

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to digital media distribution services in wireless cellular networks, and, more specifically, to distributing digital media in which each item of content includes multiple rated versions to enable parental control over the viewing of explicit material while maintaining an efficient and flexible distribution system.

Over network distribution of digital media content, especially for full track songs, is a fast growing segment of wireless telecommunication services. Such services can use a pay-as-you-go model wherein a user pays for each individual download or may use a subscription model wherein the user pays a periodic fee for the ability to perform downloads. Digital media items distributed within these types of distribution services can comprise compressed music tracks (e.g., MP3 or AAC encoded songs), wallpaper graphics, and game executable files.

A digital media distribution service must serve the needs of many different types of users who access the service with many different types of terminal devices (e.g., different models of cellular handsets). Particular media items offered for distribution are often adapted to these different types of users and/or devices by providing a plurality of different versions of a media item.

When media items are to be provided which contain inappropriate material for children, it is desirable to establish parental control to protect children from exposure to the explicit or otherwise inappropriate material. Potentially objectionable material may take the form of explicit lyrics in music tracks, mature images within wallpapers, and mature themes, graphic images, or explicit dialog in games. Thus, content providers creating the material often make various mitigated versions of the media items having the explicit material removed or altered in order to attract buyers who would object to the full version.

On the other hand, a proliferation of versions may be undesirable because subscribers may find a media distribution service to be overly confusing when presented with several versions of each particular media item. Subscribers may make errors in the selection thereby receiving the wrong version, and/or it may be difficult for a parent to monitor which versions are being downloaded. Once a full, unmitigated version has been downloaded, it typically becomes viewable or listenable by anyone possessing the device, thereby making it more difficult to loan a device from a parent to a child without having to first remove or defeat reproduction of the objectionable media item.

Media items may also need to be distributed in multiple versions in order to adapt them to different digital media devices or terminals, such as cellular handsets. Many different models of handsets are available with a wide range of hardware capabilities. In particular, each different model of mobile handset has a very specific and unique configuration for playing or reproducing audio. Some devices have one speaker while others have two speakers. Some models with two speakers can provide true stereo while others lack the proper speaker placement or characteristics to generate true stereo. A similar situation occurs with respect to downloading wallpaper files because screen size or color depth capabilities likewise vary from device to device.

The size, location, and type of speakers vary widely so that a particular music file optimized for the sound characteristics of one device would not provide acceptable performance when played on many others of the devices that the subscriber may have. To avoid undesirable complexity (i.e., an inordinate number of versions) in the distribution of music tracks, prior art music file distribution services for cellular handsets have offered just one version of a music file wherein fairly bland audio characteristics are employed so that the file provides listenable reproduction (i.e., okay but not great sound) across all potential terminal devices but may not be optimized for any single device. Furthermore, the bland equalization of the music means that the audio quality obtained on a device with better than average characteristics will be much worse than it could be. Additionally, the audio characteristics on a single device may change with time, such as when the user switches from external speakers to a headphone.

In addition to the foregoing problems, the need to advertise different versions within the distribution service is cumbersome to the service provider. Furthermore, the appearance of the service becomes cluttered and the locating of desired media items is more difficult. At the same time, the network transport bandwidth used to support download and the media storage capacity of the terminal devices have both been underutilized.

SUMMARY OF THE INVENTION

In order to balance ease of the user shopping and selection experience with the need to adapt content being accessed to the hardware and/or user characteristics of the accessing device, the present invention downloads multiple versions of a media item at the same time and then the appropriate version is activated based on a "rating" associated with the device.

In one aspect of the invention, a digital media distribution system comprises a wireless network serving a plurality of wireless subscribers wherein the wireless network supports digital media file transfer. A content server is coupled to the wireless network for distributing media items to wireless subscribers upon request. The media items each comprises a plurality of rated versions, wherein the rated versions of each particular media item depict the same media content customized to meet a respective rating from a plurality of ratings. The content server offers each media item for downloading as a single unit containing the plurality of rated versions. A subscriber terminal selects and downloads selected media items as respective single units to be stored in the subscriber terminal. The subscriber terminal includes a trigger stored in the subscriber terminal. The trigger has a value for identifying one of the plurality of ratings to be used by the subscriber terminal for accessing the downloaded media items. A media application on the subscriber terminal activates a downloaded media item according to the rated version specified by the trigger value for the subscriber terminal and ignoring the other rated versions.

DETAILED DESCRIPTION OF PREFERRED EMBODIMENTS

Figure 1:
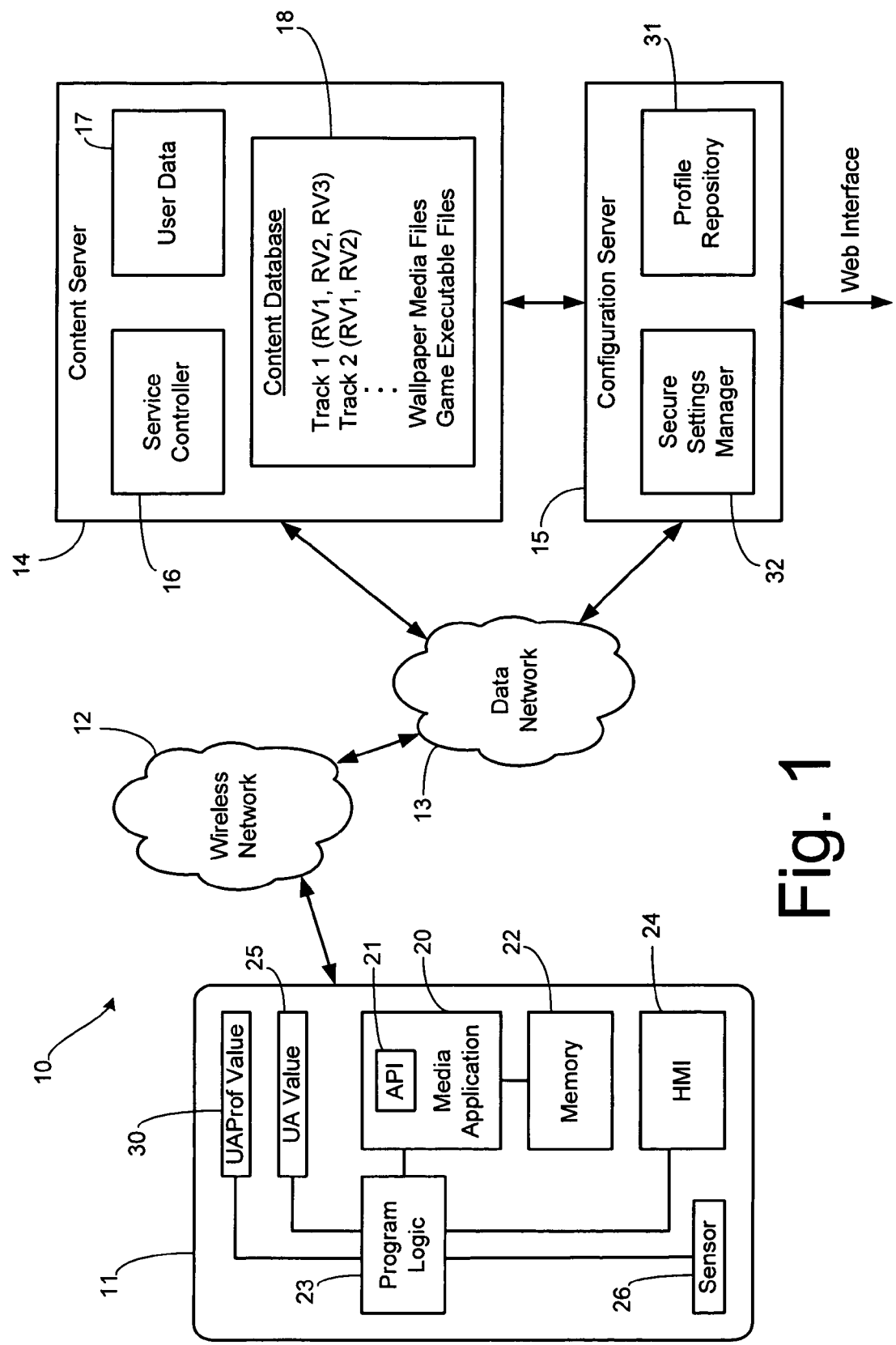
FIG. 1 is a block diagram showing a network architecture for providing a digital media distribution system of the present invention.

Referring to FIG. 1, a digital media distribution system 10 includes a wireless handset 11 coupled to a wireless network 12 such as the Sprint PCS network. A packet data network 13 couples wireless network 12 with a content server 14 and a configuration server 15. Content server 14 includes a service controller 16 for controlling operation of a digital media distribution service such as a music store, for example. A database 17 stores user data such as subscription and payment information to be used by service controller 16 for authorizing services to a subscriber. A content database 18 stores digital media items such as music tracks, wallpaper graphics, and game executable files in various ratings. For example, a music track 1 has rated versions RV1, RV2, and RV3. When music track 1 is requested by a subscriber, service controller 16 transfers a single unit including all three rated versions as is described in greater detail below.

Wireless handset 11 includes a media application 20 for downloading, managing, and activating (e.g., playing, reproducing, displaying, or executing) media items from the digital media distribution service. Media application 20 includes an application program interface (API) 21 for determining a rated version to be reproduced in accordance with a trigger value that has been set for handset 11. A memory 22 contains a plurality of rated versions of each media item downloaded as a single unit, but media application 20 only reproduces the version identified by the trigger value. In the various embodiments described below, the trigger value can relate to a rating that depends upon hardware capabilities of a handset (e.g., audio reproduction characteristics) or a rating depending upon the identity of the user of the handset (e.g., a child's phone). A trigger value stored on a handset can directly identify the "rating" to be used, or the trigger value can instead contain a pointer to a remotely stored profile which designates the rating.

Media application 20 is coupled to program logic 23 which may comprise utility programs and/or an operating system for making available a user interface or HMI 24 (e.g., a graphics display and an input keypad) to application 20 and program logic 23. In particular, program logic 23 preferably includes system utilities for accessing the trigger value(s) for updating and/or retrieval.

The trigger value may be comprised of a locally stored rating in the form of a user agent (UA) value 25. UA value 25 can be a locally stored hardware configuration value for informing media application 20 of an appropriate rating for activating a corresponding media item in a version with the proper parameters optimized for the characteristics of terminal 11. UA value 25 can also comprise a content rating set by a parent to limit access to explicit material. In that case, program logic 23 preferably includes security mechanisms such as ID and password to prevent the UA value from being altered by someone other than the parent. When UA value 25 relates to a hardware capability, the value may also be modified when a particular hardware state of handset 11 is changed. For example, an equalization characteristic or stereo format of a music track may be changed in response to the connection of a headphone with handset 11. Thus, a sensor 26 is incorporated into a headphone jack for sensing the interconnection of headphones and to signal a change in the hardware state monitored by program logic 23 (i.e., causing program logic 23 to report a different UA value to media application 20.

In one preferred embodiment using a pointer to the actual rating value, a UAProf value 30 stored in handset 11 provides a link to a profile stored in a profile repository 31 in configuration server 15. The User Agent profile preferably conforms to the standard of the Open Mobile Alliance. By establishing a profile repository accessible to application servers in the data network, the servers can identify device capabilities and adapt served applications for optimal performance on the specific handsets. In the present invention, profile repository 31 includes a plurality of profiles corresponding to the device type for handset 11 wherein each profile identifies a different respective rating associated with a handset user or the device capabilities. Thus, by changing the link contained in the UAProf value 30 of handset 11, the rating identified for handset 11 is likewise changed. A secure settings manager 32 is provided in configuration server 15 for updating the UAProf value 30 in order to include the desired link for pointing to the desired profile in repository 31 which contains the rating to be assigned to handset 11.

Figures 2, 3:
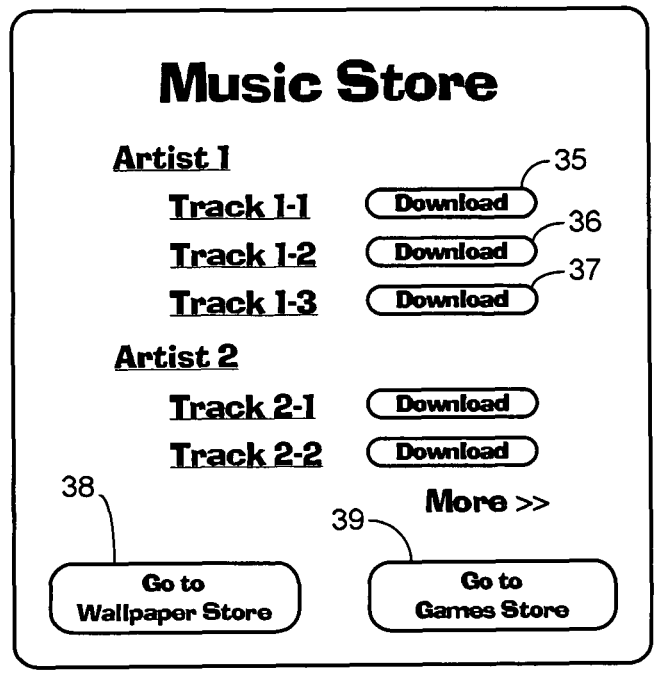
FIG. 2 shows the contents of a terminal display for advertising music tracks available for download from a music store service.
FIG. 3 shows the file contents associated with a single unit to be downloaded for a particular music track.

FIG. 2 shows a display screen that may be reproduced by the media application to permit a user to select a media item for download. A plurality of song tracks are shown for a plurality of artists, with only one version of any particular song track being shown. Thus, the user does not have to choose between different rated versions for "adult/full" or "teen/edited," for example. Thus, under an Artist 1, there appear Tracks 1-1, 1-2, and 1-3. Corresponding download buttons 35-37 each result in the downloading of a single unit containing the respective plurality of rated versions that have been prepared for the respective track. In order to instead shop for a screen saver or a game file, respective buttons 38 or 39 can be activated by the user to bring up a different section of the "store."

FIG. 3 shows an example file structure for a single unit of a song track media item. The plurality of rated versions each is labeled according to their respective ratings. In this example, each version is labeled according to both a content rating and a hardware rating. A version 1A is a full version with an adult content rating and has stereo information pursuant to a stereo hardware rating. A rated version 1B includes the same adult content, but as a monophonic file format pursuant to its "mono" hardware rating corresponding to a handset lacking stereo speakers. Versions 2A and 2B are mitigated versions having objectionable content removed or replaced to an extent acceptable for a teen listener. Versions 2A and 2B likewise provide respective stereo and mono versions. Versions 3A and 3B are further mitigated in order to provide an "all" content rating suitable for use by all children, and likewise comes in stereo and mono versions. FIG. 3 shows that multiple ratings can be handled with respective versions for each potential combination of ratings.

Figure 4:
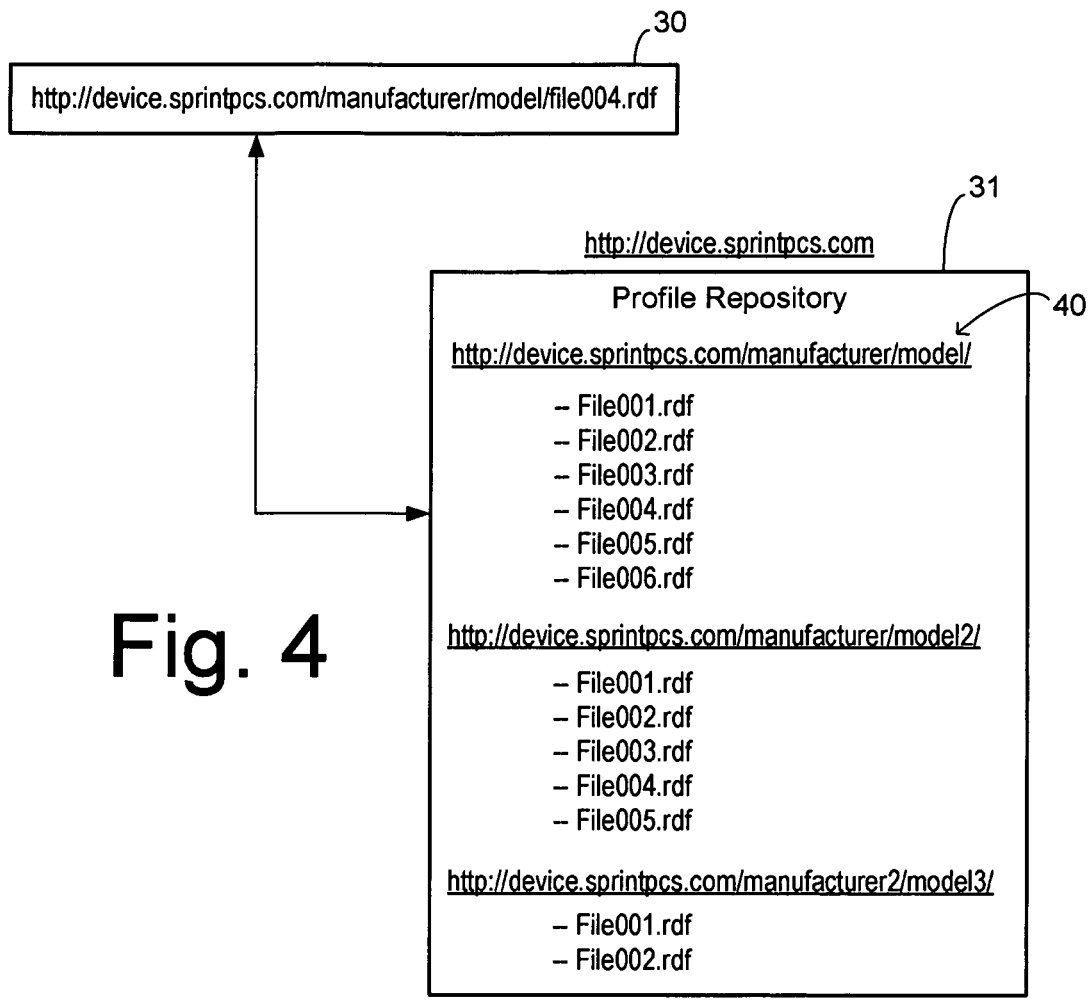
FIG. 4 shows the relationship between a UAProfs value stored in a device and a profile repository for storing User Agent profiles.

The use of a UAProf link for obtaining ratings information is shown in FIG. 4. UAProf trigger value 30 contained in a handset includes a URI or a link to a particular file stored in profile repository 31. Repository 31 contains a folder 40 corresponding to the specific model of the handset. Folder 40 includes a plurality of UAProf file versions corresponding to each of the potential device ratings that may be assigned to the handset. When link 30 is updated to a different file version, then when a corresponding media application looks up the profile it identifies a different corresponding rating.

Figure 5:
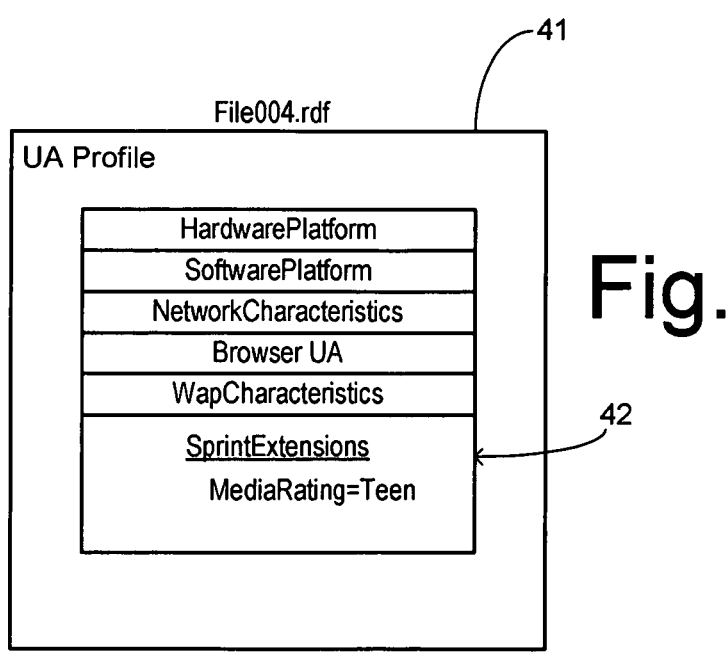
FIG. 5 shows the contents of a User Agent profile including an extension for identifying a rating to be associated with a device.

FIG. 5 shows sample contents of a profile 41 as stored in the profile repository. For a particular file named "file004.rdf," profile 41 includes standard elements such as hardware and software platforms, network characteristics, browser characteristics, and WAP characteristics. In addition, one or more carrier-specific extensions 42 may include a media rating. For example, a media rating having a text value of "teen" may be associated with the particular profile which is then reported to the media application and/or the application server when a particular media item is activated.

Figure 6:
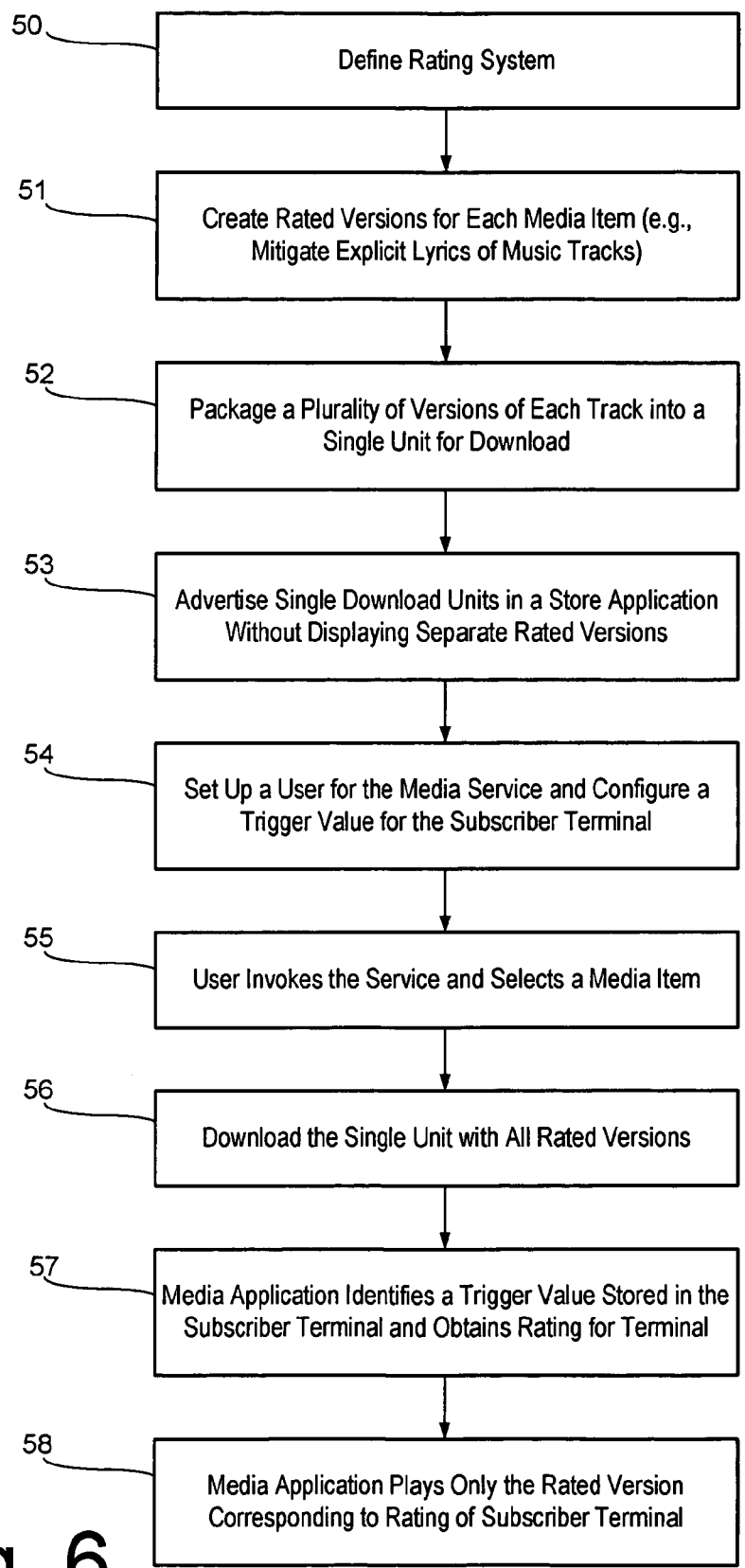
FIG. 6 is a flowchart showing one preferred method of the invention.

FIG. 6 shows a preferred method of the invention which begins with the definition of a rating system for selected media items in step 50. In step 51, the rated versions are created for each media item. For example, explicit lyrics in particular music tracks may be mitigated by using alternate versions originally recorded by the artist with altered lyrics or by electronically editing an explicit version of an original recording. For each media item, the plurality of versions of each track is packaged into a single unit for download in step 52.

In step 53, the digital media distribution service advertises the single download units in a store application (which may be implemented using a portion of the media application itself) without displaying separate rated versions. In step 54, a user is initially set up to use the media distribution service and a trigger value is configured for the subscriber's terminal by 1) assigning an appropriate UA value on the terminal and/or 2) configuring a UAProf link to identify the rating. In step 55, the user invokes the media distribution service and selects a media item. In response to the selected media item, the single unit with all rated versions is downloaded to the terminal device in step 56.

After downloading, the user will activate the downloaded media item (e.g., to play a music track, to install or launch a wallpaper or screen saver, or to launch a game). In step 57, the media application identifies a trigger value stored in the subscriber terminal and in response to the trigger value obtains a rating for the terminal. In step 58, the media application plays only the rated version corresponding to the rating of the device and ignores the other rated versions stored on the device.

What is claimed is:

1. A digital media distribution system comprising:
   a wireless network serving a plurality of wireless subscribers wherein the wireless network supports digital media file transfer;
   a content server coupled to the wireless network for distributing media items to wireless subscribers upon request, wherein the media items each comprises a plurality of rated versions, wherein the rated versions of each particular media item depict the same media content customized to meet a respective rating from a plurality of ratings, and wherein the content server offers each media item for downloading as a single unit containing the plurality of rated versions;
   a subscriber terminal for selecting and downloading selected media items as respective single units to be stored in the subscriber terminal, wherein the subscriber terminal includes a trigger stored in the subscriber terminal and having a value for identifying one of the plurality of ratings to be used by the subscriber terminal for accessing the downloaded media items, wherein the trigger value comprises a URL pointing to a User Agent Profile that identifies a selected one of the ratings;
   a profile repository on a configuration server accessed by the URL and storing the User Agent Profile corresponding to the subscriber terminal; and
   a media application on the subscriber terminal for activating a downloaded media item according to the rated version specified by the trigger value for the subscriber terminal and ignoring the other rated versions.

2. The system of claim 1 wherein the subscriber terminal includes program logic for allowing an authorized person to securely set a trigger value.

3. The system of claim 1 wherein the subscriber terminal includes program logic for automatically setting a predetermined trigger value in response to a hardware state of the subscriber terminal.

4. The system of claim 1 wherein the media items include a plurality of music tracks, and wherein the plurality of rated versions within each single unit of a music track include an explicit file version and a mitigated file version, wherein each file version is labeled according to a respective trigger value.

5. The system of claim 1 wherein the media items include a plurality of music tracks, and wherein the plurality of rated versions within each single unit of a music track include a stereo file version and a mono file version, wherein each file version is labeled according to a respective trigger value.

6. The system of claim 1 wherein the media items include a plurality of music tracks, and wherein the plurality of rated versions within each single unit of a music track include a first equalization file version and a second equalization file version, wherein each file version is labeled according to a respective trigger value.

7. The system of claim 1 wherein the media items include a plurality of wallpaper graphics, and wherein the plurality of rated versions within each single unit of a wallpaper graphic include an explicit file version and a mitigated file version, wherein each file version is labeled according to a respective trigger value.

8. The system of claim 1 wherein the media items include a plurality of game executables, and wherein the plurality of rated versions within each single unit of a game executable include an explicit file version and a mitigated file version, wherein each file version is labeled according to a respective trigger value.

9. The system of claim 1 wherein the trigger value represents a selected one of the ratings.

10. The system of claim 1 wherein the media application is comprised of a music player including an application program interface (API) for determining a rated version to be reproduced in accordance with the trigger value.

11. A telecommunication service for providing digital media to subscriber terminals, wherein the terminals each have an assigned trigger value for controlling access to explicit content using the subscriber terminal, the service comprising:
   a wireless network communicating with the subscriber terminals, wherein the wireless network supports digital media file transfer;
   a content server coupled to the wireless network for distributing media items to subscriber terminals upon request, wherein the media items each comprises a plurality of rated versions, wherein the rated versions of each particular media item depict the same media content customized to meet a respective rating from a plurality of ratings, wherein the content server offers each media item for downloading as a single unit containing the plurality of rated versions, and wherein the content server responds to a selection of a media item from a particular subscriber terminal by transmitting the plurality of rated versions regardless of the trigger value of the particular subscriber terminal; and a configuration server for identifying one of the plurality of ratings in response to the trigger value, wherein the trigger value comprises a URL pointing to a User Agent Profile in a configuration server that identifies a selected one of the ratings, and wherein the configuration server allows a user to securely modify the trigger value of the particular subscriber terminal.

12. The service of claim 11 wherein the media items include a plurality of music tracks, and wherein the plurality of rated versions within each single unit of a music track include an explicit file version and a mitigated file version, wherein each file version is labeled according to a respective trigger value.

13. The service of claim 11 wherein the media items include a plurality of music tracks, and wherein the plurality of rated versions within each single unit of a music track include a stereo file version and a mono file version, wherein each file version is labeled according to a respective trigger value.

14. The service of claim 11 wherein the media items include a plurality of music tracks, and wherein the plurality of rated versions within each single unit of a music track include a first equalization file version and a second equalization file version, wherein each file version is labeled according to a respective trigger value.

15. The service of claim 11 wherein the media items include a plurality of wallpaper graphics, and wherein the plurality of rated versions within each single unit of a wallpaper graphic include an explicit file version and a mitigated file version, wherein each file version is labeled according to a respective trigger value.

16. The service of claim 11 wherein the media items include a plurality of game executables, and wherein the plurality of rated versions within each single unit of a game executable include an explicit file version and a mitigated file version, wherein each file version is labeled according to a respective trigger value.

17. The service of claim 11 wherein the trigger value represents a selected one of the ratings.

* * * * *